United States Patent Office 3,355,437
Patented Nov. 28, 1967

3,355,437
COPOLYMERS OF AZIRIDINE COMPOUNDS
Giuliana C. Tesoro, Dobbs Ferry, N.Y., and Kelvin B. Domovs, Newark, N.J., assignors to J. P. Stevens & Co., Inc., New York, N.Y., a corporation of Delaware
No Drawing. Filed July 7, 1966, Ser. No. 563,393
7 Claims. (Cl. 260—77.5)

ABSTRACT OF THE DISCLOSURE

The process of, and the product formed by, reacting at least two aziridinyl monomers, one of the aziridinyl monomers embodying at least one aziridinyl group of one basicity type which has a radical other than hydrogen attached to the aziridinyl nitrogen; and the other of the aziridinyl monomers being polyfunctional with respect to aziridinyl groups, at least two of the aziridinyl groups of the last-named monomer being of different basicity type than the aziridinyl group of said first-named monomer and having a radical other than hydrogen attached to the respective aziridinyl nitrogens.

Also the co-reaction of the above-mentioned aziridine monomers with functional groups capable of reacting with the aziridinyl groups of the monomers, such as epoxides, amines, amides, isocyanates, mercaptans, phenols, reactive halides, alkylating agents and hydroxymethyl phosphones.

---

This is a continuation-in-part of our co-pending patent application Ser. No. 293,199, filed on July 5, 1963 now abandoned.

This invention relates to new copolymeric materials and more particularly to materials obtained by copolymerization of aziridine compounds.

The polymeric materials of this invention are the reaction products of at least two aziridinyl monomer compounds which differ in the basicity of the respective aziridine nitrogens, the difference in basicity being determined according to the Lowry Bronsted definition of acids and bases where a base is a proton acceptor and the more basic compound is one which has a greater tendency to accept the protons, regardless of pH, with at least one of the aziridinyl monomers being at least bifunctional with respect to the aziridine radicals. The aziridinyl compounds with which this invention is concerned have a group other than hydrogen attached to the aziridine nitrogen.

Reactions between two aziridinyl monomers of the same basicity where one is bifunctional produce no distinct interaction. Thus it is essential that the two monomers have aziridinyl functional groups of different basicities. The bifunctional character is believed to be necessary in order to obtain cross-linked 3-dimensional polymers.

Among the types of aziridinyl functional groups which may be embodied in the monomers which form the initial reactants for the copolymers of this invention are the following shown in Table I below:

TABLE I

| Type of Aziridinyl Functional Group | Formula |
|---|---|
| (1) Amine | $-\mathrm{CH-N{\triangleleft}^{-R}}$ |
| (2) Carbamate | $-\mathrm{O-\overset{O}{\overset{\|}{C}}-N{\triangleleft}^{-R}}$ |
| (3) Carboxamide | $-\overset{\|}{\underset{\|}{\mathrm{C}}}-\overset{O}{\overset{\|}{\mathrm{C}}}-\mathrm{N}{\triangleleft}^{-R}$ |
| (4) Carbamide or thiocarbamide | $-\mathrm{N}-\overset{X^{*}}{\overset{\|}{\mathrm{C}}}-\mathrm{N}{\triangleleft}^{-R}$ |
| (5) Phosphoramide | $-\overset{X}{\overset{\|}{\mathrm{P}}}-\mathrm{N}{\triangleleft}^{-R}$ |
| (6) Cyanuramide | $=\mathrm{N}-\overset{-\mathrm{N}}{\overset{\|}{\mathrm{C}}}-\mathrm{N}{\triangleleft}^{-R}$ |
| (7) Phosphonitrilamide | $=\mathrm{N-P}\underset{\mathrm{N}{\triangleleft}}{\overset{-\mathrm{N}\ \mathrm{N}{\triangleleft}^{-R}}{}}$ |

*X is oxygen or sulfur.

In Table I above, the notation:

is intended to have the following structural meaning:

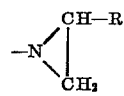

where R is selected from the group consisting of hydrogen and lower alkyl radicals having from one to five carbon atoms.

The seven types of aziridinyl functional groups shown in Table I have differing basicities, one from the other, by reason of the structure of the group, specifically the manner of attachment to the aziridinyl nitrogen. These groups are representative of those embodied in compounds which are employed in this invention, and compounds containing aziridinyl functional groups other than those referred to above may also be used as monomers in the preparation of the copolymers of this invention.

Examples of the aziridinyl monomers which may be employed in the preparation of the new copolymers of this invention are shown in Table II below. In Table II, the monomers are grouped according to the manner of attachment of the aziridinyl nitrogen, as typified in Table I above. For each monomer, the degree of functionality with respect to aziridinyl functional groups is also indicated.

TABLE II

| Reference Code | Formula | Type* | Functionality |
|---|---|---|---|
| [A] | >NCH$_2$CH$_2$SO$_2$CH$_2$CH$_2$N< | (1) | 2 |
| [B] | >N—CH$_2$CH(CH$_3$)—C$_6$H$_4$—CH(CH$_3$)—CH$_2$N< | (1) | 2 |
| [C] | >N—CH(CH$_3$)—CH$_2$C(O)—O(CH$_2$)$_4$O—C(O)—CH$_2$CH(CH$_3$)—N< | (1) | 2 |
| [D] | >N—[CH$_2$CH$_2$O]$_x$—CH$_2$CH$_2$N< (wherein X is an integer between 1 and 50) | (1) | 2 |
| [E] | >N—CH$_2$CH$_2$—C$_6$H$_5$ | (1) | 1 |
| [F] | >N(CH$_3$)—C(O)—OCH$_2$CH$_2$O—C(O)—N(CH$_3$)< | (2) | 2 |
| [G] | >N(CH$_3$)—C(O)—(CH$_2$)$_4$—C(O)—N(CH$_3$)< | (3) | 2 |
| [H] | >N(CH$_3$)—C(O)—C$_6$Cl$_4$—C(O)—N(CH$_3$)< | (3) | 2 |
| [I] | 1,2,4-C$_6$H$_3$[C(O)—N(CH$_3$)<]$_3$ | (3) | 3 |
| [J] | >N—C(O)—NH(CH$_2$)$_6$—NHC(O)—N< | (4) | 2 |
| [K] | CH$_3$CH$_2$CH$_2$NHC(O)—N< | (4) | 1 |
| [L] | [>N=]$_3$PS | (5) | 3 |
| [M] | [>N=]$_3$PO | (5) | 3 |
| [N] | [>N(CH$_3$)=]$_3$PO | (5) | 3 |
| [O] | [>N(CH$_3$)=]$_2$PO(C$_6$H$_5$) | (5) | 2 |
| [P] | triazine tris(aziridinyl) | (6) | 3 |

| Reference Code | Formula | Type* | Functionality |
|---|---|---|---|
| [Q] | (complex phosphazene-aziridinyl structure with CH₃ groups) | (7) | 6 |

*See Table I for Key to Type.

From the above it will be seen that for example the reaction of monomers [E] and [K] is not included as part of the invention unless another monomer from said group is also employed, the reason being that monomers [E] and [K] are only monofunctional with respect to the aziridinyl group and for preparing the copolymers of this invention it is essential that the reaction mixture contain at least one aziridinyl monomer which is at least bifunctional with respect to aziridinyl grouping.

The functionality of the monomers with respect to aziridinyl functional groups can range from unity upwards. In the monomers of Table II which are polyfunctional, e.g. have a functionality greater than unity, all of the aziridinyl groups are of the same basicity. In other words, the monomers which are polyfunctional contain aziridinyl groups of one type only. It is to be appreciated that polyfunctional monomers which contain aziridinyl groups of different type are also suitable for purposes of this invention.

The basic reaction of the present invention involves the use of two monomers, each containing aziridinyl functional groups. One of the monomers must embody at least one aziridinyl group. The other monomer must embody more than one aziridinyl group, e.g. it must be polyfunctional with respect to this group; and at least two of the aziridinyl groups must be of different basicity type than the group embodied in the first monomer.

In carrying out the polymerization reactions of the present invention, it is desirable, although not necessary, to employ elevated temperatures. Temperatures above 180° C., however, are not generally desirable. Pressure may be varied over wide ranges and the reactions may be carried out at atmospheric, super-atmospheric or sub-atmospheric pressures. The monomers can be added together in any desired sequence and they may be combined in any desired ratio, although the ratios of the various monomers will to an extent determine the yield and properties of the resultant polymer. It is possible to withhold a portion of one or more of the monomers and subsequently complete the polymerization reaction by introducing an additional monomer. One or more monomers may be added entirely or in part subsequent to an initial pre-polymer formation. Reactive components may also be grafted to another previously formed polymer provided such polymer contains reactive sites capable of combining with at least one of the aziridine monomers.

The monomer mixture may contain other substances such as diluents, solvents, filler, polymerization accelerators or retarders in addition to the two aziridinyl monomers. The use of solvents is desirable in some instances although not necessary. Additional reactants can also be employed in order to modify the structure of the copolymer formed. Such coreactants should contain functional groups capable of reacting with the aziridinyl groups of the essential comonomers. Among these are, for example, epoxides, amines, amides, isocyanates, mercaptans, phenols, reactive halides, alkylating agents, hydroxymethyl phosphines and the like.

Among the preferred coreactants are the following:

TABLE III

| Formula | Reference Code |
|---|---|
| Cl—CH₂C(=O)—O(CH₂CH₂O)₂C(=O)—CH₂Cl | [X] |
| O—CH₂—CH—CH₂ (phenyl glycidyl ether structure) | [Y] |
| (phenyl)—O—CH₂—CH—CH₂ (epoxide) | |
| NH₂(CH₂CH₂NH)₃CH₂CH₂NH₂ | [Z] |

Catalysts are not necessary in carrying out these polymerization reactions, although they can be used as accelerators to initiate the polymerization reaction. Any acidic or acid-forming compound can be used as a catalyst.

The time required to form a gel may be taken as an indication of the polymerization rate. It is not necessarily identified with it, although it is generally related to it. Thus the time required to form a gel is a useful indication of the reactivity of the system. High reactivity is generally desired. The presence of diluents and inert solvents generally decreases the rate of reaction and hence provides a useful means for controlling the polymerization.

The polymeric materials produced by this invention are resinous and rubbery infusible or thermoplastic solid materials having physical and chemical properties which make them useful as textile, paper and leather finishes, dye fixation agents, ion exchange absorbents, binders, adhesives, protective coatings, and materials of construction.

For a more detailed understanding of this invention, reference should now be made to the following examples which are illustrative of this invention. Obviously many modifications will be apparent to those skilled in the art and applicants intend to be bound only by the spirit and scope of the appended claims.

In the following examples the yield was determined from the weight of the insoluble gelled product which was determined by washing each comminuted gel by decantation at least five times with methanol and drying it at 80° C. At least 20 hours elapsed between successive decantations to allow time for diffusion from the interior of the gel of the larger particles. Yield is expressed as a percentage of the total weight of reactant.

In these examples the reference to heating for a period of "x" times the gel time was an arbitrary way of assuring that the reaction proceeded to essential completion.

EXAMPLES—REACTIONS BETWEEN AMINE (1) AND CARBAMATE (2)

*Example 1*

Monomer [B] and monomer [F] were mixed in various proportions and heated to 93° C. The time at which each mixture began to gel was as follows:

| Percent [B] | 0 | 10 | 20 | 30 | 40 | 50 | 60 | 70 | 80 | 90 | 100 |
|---|---|---|---|---|---|---|---|---|---|---|---|
| Minutes | ng | ng | 50 | 33 | 27 | 30 | 38 | 53 | 84 | 140 | ng |

Throughout the examples "ng" indicates that the material did not gel.

With about 40% of monomer [B], maximal reaction rate, strength, and freedom from color were achieved. Such a gel, formed either with or without an added catalyst, showed much greater strength, adhesion to the glass and lack of color than the homopolymer formed from either [B] or [F] alone with the aid of sulfur dioxide as a catalyst.

Example 2

The ternary mixture of 25% of monomer [C], 25% of monomer [B] and 50% of monomer [F] gelled in 12 minutes at 130°. Heated 30 minutes, it was tough, flexible and colorless. The methanol-insoluble yield was 42% of polymer having a dye absorption value of 4.0 meq./g. A similar mixture gelled in about 40 minutes at 100° C.

The Dye Absorption Capacity=meq. of Orange II Acid [1] absorbed per gram of polymer.

The Dye Absorption Capacity was determined by the following test:

To about 0.2 g. of isolated gel, 2.0 ml. of glacial acetic acid were added, followed by a measured excess of 0.04 N aqueous Orange II Acid. After a week at room temperature, with occasional shaking, an aliquot of the supernatant liquid was analyzed color-metrically at 4850 Angstrom.

Example 3

A mixture of 47% of monomer [B], 20% of monomer [F], and 33% of coreactant [X] yielded a rubbery, yellowish gel in about 600 minutes at 25° C. The dye absorption value of the resin was 6.1 meq./g. The yield was 32%.

Example 4

A mixture of equal parts of monomer [B], [F] and coreactant [Y] yielded a soft gel after 13 minutes at 100° C.

Example 5

To portions of a 3:2 mixture of monomers [F] and [B], various proportions of coreactant [Z] were added as follows:

| Percent [Z] | 0 | 10 | 20 | 30 |
|---|---|---|---|---|
| Min. to gel at 130° C | 4 | 2 | 2 | 2 |

[Z] raised both the rate of reaction and the flexibility of the resin obtained. With 10% of [Z], the gel retained great toughness and formed a strong bond to glass. With 30% of [Z], the copolymer was a tacky rubber.

Similar results were found in the following copolymerization experiments:

5(a). [E] and [F] at 100° C.
5(b). [D], wherein "X" is about 12, and [F] at 130° C.
5(c). [A] and [F] at 121° C.

[1] p (2-hydroxy-1 naphthylazo) benzene sulfonic acid.

REACTIONS BETWEEN CARBAMIDE (4) AND CARBAMATE (2)

Example 6

Several suspensions of the solid monomer [J] in various proportions of monomer [F] were heated to 115° C., at which temperature homogeneous solutions formed, for about ten times the gel time, as follows:

| Percent [J] at start | 79 | 60 | 26 | 13 |
|---|---|---|---|---|
| Minutes to gel | 20 | 21 | 46 | 125 |
| Percent yield | 93 | 89 | 68 | |
| Percent Nitrogen found | 19.0 | 17.5 | 14.8 | |
| Percent [J] in copolymer | 69 | 53 | 25 | |

The nearly invariant gel time occurring with proportions of [J] between 60 and 100% is noteworthy, as well as the ability of [F] to gel in the presence of a minor fraction of [J] but not in the absence of [J]. This behavior contrasts with that of [J] when mixed with an inert solvent such as tetraglyme (tetraethylene glycol dimethyl ether) instead of [F]. Tetraglyme in minor proportions raises the gel time, and at proportions of 50% and greater causes precipitation instead of gelation.

Example 7

A mixture of equal parts of monomer [F] and monomer [G] yielded a thermoplastic solid in 480 minutes at 130° C., while the two components, heated separately, remained liquid of increased viscosity.

Example 8

With equal parts of monomer [F], [H] and the solvent o-dichlorobenzene, a weak gel formed in 30 minutes at 100° C.

REACTIONS BETWEEN AMINE (1) AND CARBAMIDE (4)

Example 9

The heating of several mixtures of monomers [B] and [K], neither of which gels by itself, showed that with about equal weights of the two, maximal reaction rate, yield and strength resulted as follows:

| Percent [K] | 13 | 25 | 47 | 78. |
|---|---|---|---|---|
| Gel time and temperature (°C.) | ng | ng | 152 min. at 100° | 520 min. at 100° +20 min. at 130°. |
| Properties when cold | Liquid | Liquid | Strong | Weak. |
| Percent yield | | | 72 | 30. |

Similar results were found in the following copolymerization experiments:

9(a). [B] and [J] at 115° C.
9(b). [A] and [J] at 121° C.

REACTIONS BETWEEN AMINE (7) AND PHOSPHORAMIDE (5)

Example 10

Mixtures of monomers [B] and [L] were heated at 100° C. for ten times the gel time of each with the following results:

| Percent [L] | 0 | 23 | 49 | 79 | 100. |
|---|---|---|---|---|---|
| Min. to gel | ng | 70 | 19 | 12 | 114. |
| Gel strength | Fluid | Very weak | Strong | Strong | Weak. |
| Percent yield | 0 | 71 | 95 | 81 | |

Thus, with about 50% of [L], maximal reaction rate, yield and strength were obtained.

Similar results were found in the following copolymerizations:

10(a). [B] and [M] at 130° C.
10(b). [B] and [N] at 130° C.

10(c). [B] and [O] at 100° C. to 130° C.
10(d). [A] and [L] at 121° C.

REACTION BETWEEN AMINE (1) AND CYANURAMIDE (6)

Example 11

Monomer [P] was suspended in various proportions in monomer [B] and heated at 100° C. While [P] by itself failed to gel, possibly because it did not melt before polymerizing, and while [B] remained fluid, mixtures of the two became firmly cemented masses.

| Percent [P] | 21 | 46 | 76 |
|---|---|---|---|
| Min. to gel at 100° | 120 | 56 | 40 |

REACTIONS BETWEEN PHOSPHONITRILAMIDE (7) AND PHOSPHORAMIDE (5)

Example 12

Mixtures of [Q] and [L] showed distinct interaction during polymerization, as follows: (each was heated for ten times the gel time).

| Percent [Q] | 0 | 16 | 50 | 82 | 100 |
|---|---|---|---|---|---|
| Min. to gel at 130° | 12 | 9.5 | 11 | 11 | 21 |
| Percent yield | [1] 62 | ([2]) | 88 | 59 | 62 |

[1] This yield was determined on a second sample heated at 115° instead.
[2] Reacted violently with some decomposition 0.5 minute after gelling.

REACTIONS BETWEEN AMINE (1) AND CARBOXAMIDE (3)

Example 13

With mixtures of monomers [B] and [G], maximal reaction rate and strength were found at concentrations of [G] between about 20% and 40%. All these gels were less rigid than the strongest gels made from [B] and [F] (Ex. 1). The gelation of [B] and [G] proceeded as follows:

13(a).

| Percent [G] | 10 | 22 | 33 | 43 | 54 |
|---|---|---|---|---|---|
| Min. to gel at 100° C | 240 | 114 | 131 | 255 | 390 |
| Gel character | Very soft | Soft | Soft | Sticky | Visco-elastic |

13(b).

| Percent [G] | 0 | 30 | 50 | 70 | 100 |
|---|---|---|---|---|---|
| Min. to gel at 130° C | ng | 12 | 23 | 103 | ng 480 |

Example 14

Equal parts of monomers [B], [I] and tetraglyme solvent yielded a tough amber rubber in about 60 minutes at room temperature. After it had remained standing for two days, extraction by methanol left a 79% yield of polymer having a dye absorption capacity of 4.0 meq./g.

Substitution of additional tetraglyme for all the [B] of the above formulation gave much inferior gelation.

Example 15

A solution of 32 parts of monomer [H] and 36 parts of hot o-dichlorobenzene was cooled and mixed with 31 parts of monomer [B]. Within 60 minutes at 25°, a tough green gel formed which later turned amber and got still tougher. After it had stood for two days, its extraction with methanol left an 89% yield of gel.

At 100° C., equal parts of monomer [H], [B] and orthodichlorobenzene formed within two minutes a tough gel which could not be pried from the reaction tube.

REACTIONS BETWEEN AMINE (1) AND PHOSPHONITRILEAMIDE (7)

Example 16

Gels were formed by heating mixtures of monomers [B] and [Q] at 100° C. as follows:

| Percent [Q] | 25 | 52 | 83 | 100 |
|---|---|---|---|---|
| Min. to gel at 100° C | ng | 400 | 400 | 280 |
| Gel character | | ([1]) | ([1]) | ([2]) |

[1] Soft when cold.
[2] Tough cold, soft at 100°.

REACTIONS BETWEEN CARBAMIDE (4) AND CARBOXAMIDE (3)

Example 17

Mixtures of monomers [J] and [G] gelled as follows:

| Percent [J] | 100 | 91 | 81 | 71 | 60 | 40 | 11 | 0 |
|---|---|---|---|---|---|---|---|---|
| Min. to gel at 117° C | 17 | 30 | 43 | 57 | 89 | 420 | 540 | ng |

Small proportions of monomer [J] sufficed to cause gelation with monomer [G]. Replacement of all monomer [G] by the inert diluent tetraglyme resulted in formation of discrete particles instead of continuous gel. However, compared to tetraglyme, [G] resulted in a lower reaction rate.

REACTIONS BETWEEN CARBAMATE (2) AND PHOSPHONITRILAMIDE (7)

Example 18

Mixtures of monomers [F] and [Q] gelled at 130° C. as follows during a total heating time of 300 minutes for each.

| Percent [Q] | 0 | 19 | 50 | 79 | 85 | 100 |
|---|---|---|---|---|---|---|
| Min. to gel | ng | 230 | 250 | 230 | 135 | 21 |
| Percent yield | 0 | 28 | 6 | 40 | 63 | [1] 62 |

[1] This yield was determined on a second sample heated instead at 115° C. for 600 minutes, ten times its gel time.

Copolymers formed with a wide range of compositions though no maxima in rate or yield were found for any mitxure.

REACTIONS BETWEEN CARBAMATE (2) AND AND PHOSPHORAMIDE (5)

Example 19

Mixtures of monomers [F] and [L] with a broad range of compositions gave high yields of gels at 130° C., as follows (each was heated 150 minutes):

| Percent [L] | 0 | 24 | 48 | 75 | 88 | 100 |
|---|---|---|---|---|---|---|
| Min. to gel | ng | 40 | 25 | 16 | 16 | 12 |
| Percent yield | 0 | 78 | 90 | 100 | 100 | |

Example 20

Results similar to those of Example 19 were found with mixtures of monomers [F] and [M] heated at 130° for 300 minutes, as follows (dry weights of monomer [M], supplied as an 85% methanolic solution are recorded):

| Percent [M] | 0 | 10 | 40 | 67 | 82 | 100 |
|---|---|---|---|---|---|---|
| Min. to gel | ng | ng | 100 | 100 | 120 | 80 |
| Percent yield | 0 | 0 | 54 | 63 | 64 | |

Example 21

The following copolymers, prepared as in Example 1, were tested for their total hydrochloric acid exchange capacity and their absorption capacity for the acid form of the dye Orange II:

| Percent [B] | 33 | 50 | 67 | 33 |
|---|---|---|---|---|
| Percent [F] | 67 | 50 | 33 | 33 |
| Percent Tetraglyme | 0 | 0 | 0 | 34 |
| Min. to gel at 130° | 6 | 5 | 8 | 15 |
| Gel strength | Tough | Very tough | Tough | Weak |
| Percent yield | 55 | 80 | 73 | 91 |
| Dye Absorption Capacity Dp (meq/g.) | 3.4 | 1.7 | 0.9 | 0.9 |
| Acid Exchange Capacity Hp | 3.1 | 2.6 | 3.6 | ------ |

Each product was heated for 2½ times the gel time. Each was transparent and nearly colorless.

The Acid Exchange Capacity=the meq. of hydrochloric acid absorbed per gram of polymer.

The Acid Exchange Capacity was determined by the following test:

To about 0.2 g. of isolated gel, a measured excess of 0.04 N aqueous hydrochloric acid was added. After equilibration for a week, an aliquot of the supernatant acid was titrated with standard alkali.

Example 22

Starting with a free-flowing mixture of 2 parts of monomer [B] and 3 parts of monomer [F] an eleven ply 0.128 inch laminate was made with heat cleaned fiberglass fabric treated with Volan A, cured at 93° for 120 minutes, and post-cured at 177° for 60 minutes. The dry flexural strength was 74,900 p.s.i. and after an eight hour boil in water the dry flexural strength of the laminate was still 62,500 p.s.i. The flexural modulus of elasticity was $2.2 \times 10^6$ p.s.i. dry, and after an eight hour boil it was $1.8 \times 10^6$ p.s.i. The hardness of 60 (Barcol test), the dielectric constant of 4.35, and the dissipation factor of 0.0109 like the strength and modulus, were in the range of these values for commercially useful resin-fiberglass laminates.

Good laminates were also made with the same comonomers and other glass fabrics (e.g. cloths finished with epoxy-silane, or amino silanes such as Union Carbide A–1100 and Dow Corning 6030) and with rovings and non-woven mats.

The refractive index of the monomer mixture can be adjusted so as to match the refractive index of certain solid fillers or substrates. Thus the 2:3 mixture of monomers [B] and [F] (refractive index=1.488) remained transparent when filled and cured with "Cab-O-sil" silica or untreated Pyrex glass wool.

Example 23

A 3:2 mixture of monomers [F] and [B] was applied to shiny aluminum foil as a 10% solution in carbon tetrachloride, dried and heat cured. Though the coating was so thin that diffraction rings appeared, it prevented any visible attack of the aluminum by drops of 0.2 N hydrochloric acid and sodium hydroxide, respectively, allowed to evaporate on the surface. Control samples of unprotected surfaces were obviously corroded under these conditions.

The surface of polyethylene was hardened by a thin layer of a 3:2 mixture of [F] and [B] monomers cured on it. Similarly a scratched piece of glass was strengthened and transparentized by having a layer of the same copolymer cured upon it.

By itself, the 3:2 [F]–[B] copolymer, when gradually heated in air, slowly turned yellow beginning at 220° C. and black without melting at 290° C. Some condensable vapor was evolved during prolonged heating at 290° C. The same copolymer, compared with an acid-catalyzed homopolymer from [B] showed greatly improved resistance to dilute peracetic acid.

Example 24.—Adhesive

Two thin sheets of glass with an interlayer of a 3:2 [F]–[B] copolymer cured between them gained shatter resistance. Two sheets of Du Pont Mylar polyester likewise was laminated securely.

The same comonomer mixture was used to repair broken porcelain and aluminum apparatus. The latter held a vacuum of one micron.

It is to be understood that the proportions and ratios of monomers as expressed in the foregoing examples and in the claims are parts by weight thereof.

What we claim is:

1. A process of preparing a polymeric material comprising reacting together as the sole polymerizable ingredients at least two aziridinyl monomers which differ in the basicity-type of their respective aziridine nitrogens as evidenced by their having different aziridinyl functional groups selected from the class consisting of amine, carbamate, carboxamide, cyanuramide, phosphonitrilamide and carbamide, said monomers being selected from the group consisting of

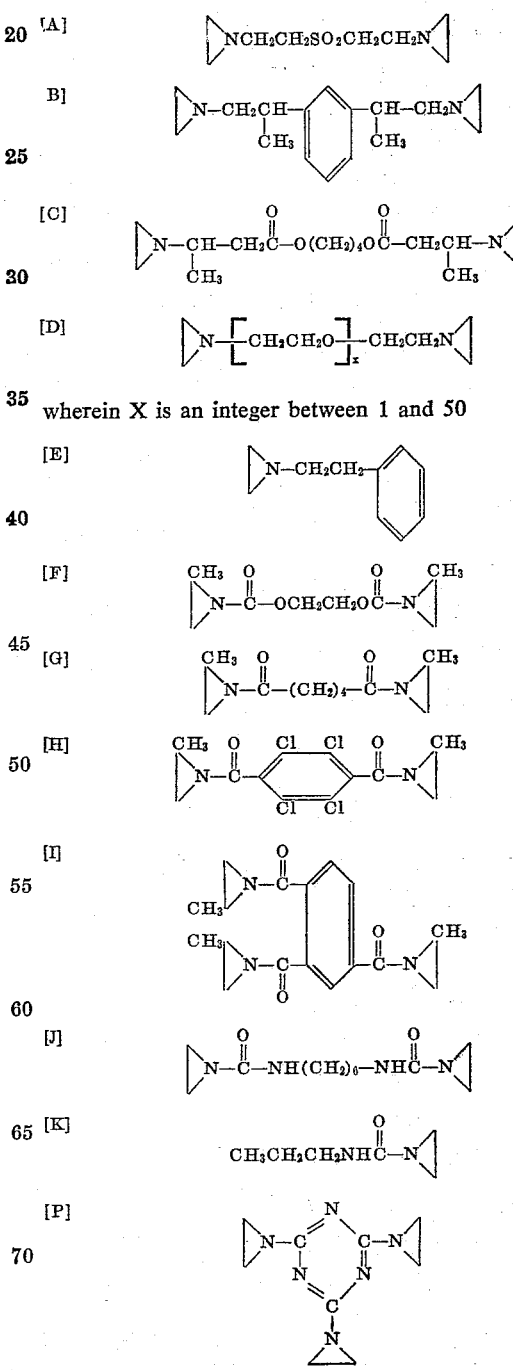

wherein X is an integer between 1 and 50

[Q] 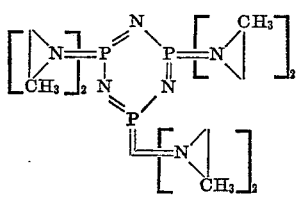

at least one of said two different monomers being at least bifunctional with respect to the aziridine group, and recovering the desired polymeric material.

2. The polymeric material prepared according to claim 1.

3. The polymeric material prepared according to claim 1 wherein the monomer

[D] 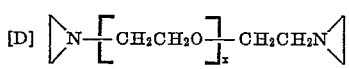

wherein X is an integer between 1 and 50 is reacted with the monomer

[F] 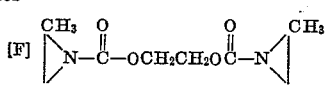

4. The polymeric material according to claim 3 wherein in the monomer [D] the integer X has an average value of about 12.

5. A process of preparing a polymeric material comprising reacting together at least two aziridinyl monomers which differ in the basicity-type of their respective aziridine nitrogens as evidenced by their having different aziridinyl functional groups selected from the group consisting of amine, carbamate, carboxamide, cyanuramide, phosphonitrilamide and carbamide, said monomers being selected from the group consisting of

[A] 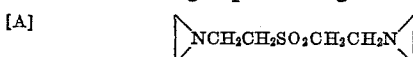

[B] 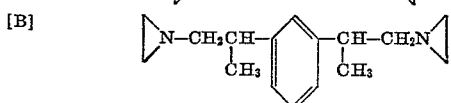

[C] 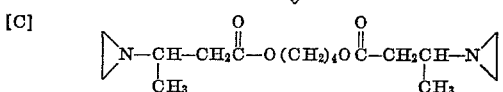

[D] 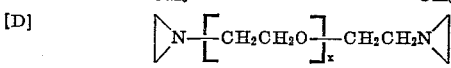

wherein X is an integer between 1 and 50

[E] 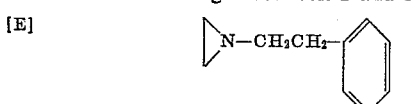

[F] 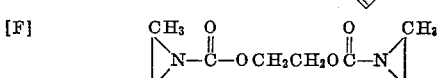

[G] 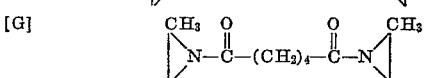

[H] 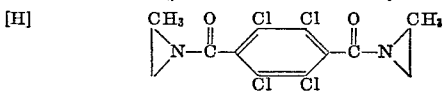

[I] 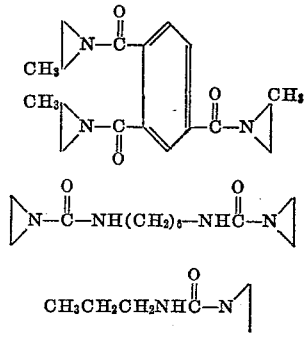

[J] 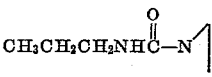

[K] 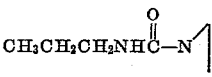

[P] 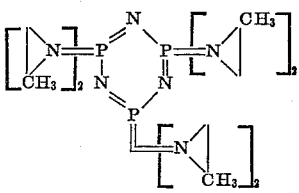

[Q] 

and a co-reactant selected from the group consisting of

[X] 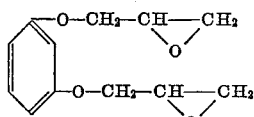

[Y] 

[Z]   $NH_2(CH_2CH_2NH)_3CH_2CH_2NH_2$ said aziridinyl monomers and said coreactant being the sole polymerizable ingredients, and recovering the desired polymeric material.

6. The polymeric material prepared according to claim 5.

7. The polymeric material prepared according to claim 5 wherein the aziridinyl monomers are selected as [D] and [F].

References Cited
UNITED STATES PATENTS

| | | | |
|---|---|---|---|
| 2,272,489 | 2/1942 | Ulrich | 260—2 |
| 2,360,192 | 10/1944 | Bestian | 260—77.5 |
| 2,582,594 | 1/1952 | Kropa et al. | 260—2 |
| 2,626,931 | 1/1953 | Bestian | 260—2 |
| 2,901,443 | 8/1959 | Starck et al. | 260—2 |
| 3,162,617 | 12/1964 | Smith | 260—77.5 |
| 3,223,681 | 12/1965 | Rambosek | 260—2 |
| 3,225,013 | 12/1965 | Fram | 260—2 |

SAMUEL H. BLECH, *Primary Examiner.*

UNITED STATES PATENT OFFICE
CERTIFICATE OF CORRECTION

Patent No. 3,355,437                      November 28, 1967

Giuliana C. Tesoro et al.

It is hereby certified that error appears in the above numbered patent requiring correction and that the said Letters Patent should read as corrected below.

Column 1, lines 31 and 32, for "phosphones" read -- phosphines --; column 2, TABLE I, second column, the last form should appear as shown below instead of as in the patent:

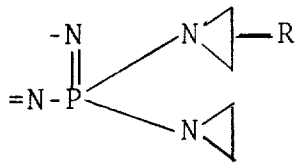

column 7, lines 35 and 36, for "color-metrically at 4850 Angst read -- colorimetrically at 4850 Angstroms --; column 8, line 57, for "(7)" read -- (1) --; column 10, line 4, for "PHOSPHONITRILEAMIDE" read -- PHOSPHONITRILAMIDE --; column 11 line 47, for "Cab-O-sil" read -- Cab-O-Sil --; column 14, line 12, Equation (K) should appear as shown below instead of as in the patent:

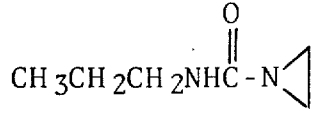

Signed and sealed this 22nd day of July 1969.

(SEAL)
Attest:

EDWARD M. FLETCHER, JR.                    WILLIAM E. SCHUYLER, JR.
Attesting Officer                               Commissioner of Patents